United States Patent

[11] 3,545,559

[72] Inventors William A. Jones
P.O. Box 954, and Robert R. Swaner, P.O. Box 371, both of Hailey, Idaho 83333
[21] Appl. No. 768,366
[22] Filed Oct. 17, 1968
[45] Patented Dec. 8, 1970

[54] ENDLESS TRACK ATTACHMENT FOR MOTORCYCLES
4 Claims, 8 Drawing Figs.

[52] U.S. Cl. .................................................. 180/5, 180/9.24; 305/35
[51] Int. Cl. .................................................. B62m 27/02
[50] Field of Search .................................. 305/35(BB), 38, 18, 52, 180/5, 9.24

[56] References Cited
UNITED STATES PATENTS

| | | | |
|---|---|---|---|
| 1,518,465 | 12/1924 | Sternberg | 305/52X |
| 2,341,000 | 2/1944 | Tacker | 305/18X |
| 2,412,122 | 12/1946 | Campbell | 305/38 |
| 2,992,863 | 7/1961 | Fredricks | 305/57 |
| 3,077,238 | 2/1963 | Nelson | 180/5 |
| 3,318,403 | 5/1967 | Hansen | 180/5 |
| 3,412,820 | 11/1968 | Wachholz | 180/5 |

FOREIGN PATENTS

| | | | |
|---|---|---|---|
| 696,937 | 11/1964 | Canada | 180/9.24A |

Primary Examiner—Richard J. Johnson

ABSTRACT: This invention consists of two endless tracks that are mounted on supporting and rotating mechanisms that are both secured to, and support a rear axle of a motorcycle. One endless track is mounted on each side and at the rear end of the motorcycle. Each endless track embodies an endless belt to the outside of which is bolted a plurality of equally spaced angle irons. Each outer end of the equally spaced angle irons has a bolt secured thereto on which is located a steel roller having a bronze liner therein. Each roller is adapted to fit into one of the U-shaped recesses in the periphery of a combination sprocket and wheel that is mounted on each end of the aforesaid axle. Actually, there are two sprockets and wheels for each of the endless tracks. Each aforesaid supporting and rotating mechanism embodies framework adapted to support not only the aforesaid axle but also a plurality of bogie wheels that in turn give rotating support to the endless track. The track is prevented from slipping off its supporting and rotating structure by means of a plurality of inverted U-shaped straps that are bolted to each belt in equal and parallel spaced relation to one another.

PATENTED DEC 8 1970

*INVENTORS*
WILLIAM A. JONES
ROBERT R. SWANER

PATENTED DEC 8 1970

3,545,559

INVENTORS
WILLIAM A. JONES
ROBERT R. SWANER

ENDLESS TRACK ATTACHMENT FOR MOTORCYCLES

This invention relates to endless tracks; more particularly, to an endless track that is attached to a motorcycle.

It is the principal object of this invention to provide an endless track attachment for motorcycles that will permit the motorcycle to be ridden in snow and on terrain that would not be possible otherwise with an entirely wheeled cycle.

Another object of this invention is to provide an endless track attachment for motorcycles that can be secured to the rear axle of nearly any type of motorcycle in a minimum of time and with a minimum of effort.

Another object of this invention is to provide an endless track attachment for motorcycles that will give the desired additional stability to the motorcycle when it is being ridden in snow or on ice or the like.

Still another object of this invention is to provide an endless track attachment for motorcycles, the endless track and its attaching parts embodying a minimum amount of easily assembled and maintained mechanism.

Other and further objects and advantages of this invention will appear as the reading of this specification proceeds and the accompanying drawings are examined.

In the drawings.

In the several views of this invention, like parts are indicated by like reference numbers.

The reference number 10 indicates a typical motorcycle having this invention attached thereto.

Figure 1:
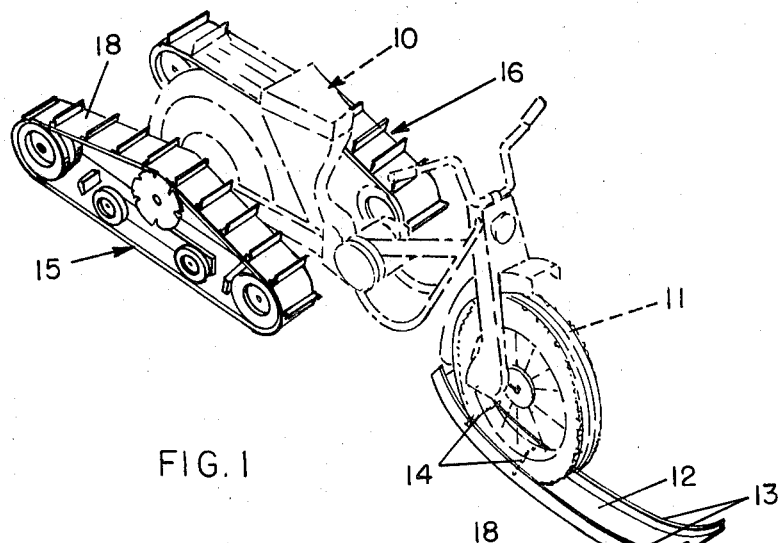
FIG. 1 is a pictorial view of this invention secured to the rear end of a motorcycle. The motorcycle is shown in phantom lines.

The motorcycle 10 has its rear wheel removed and its front wheel 11 resting on a skid 12 having upturned sides 13 that extend the full length of the skid. Two spaced and parallel chains 14 are used to suitably secure the aforesaid skid 12 to the front wheel 11, as one can clearly see by looking at FIGS. 1 and 3 of the accompanying drawings.

Figure 3:
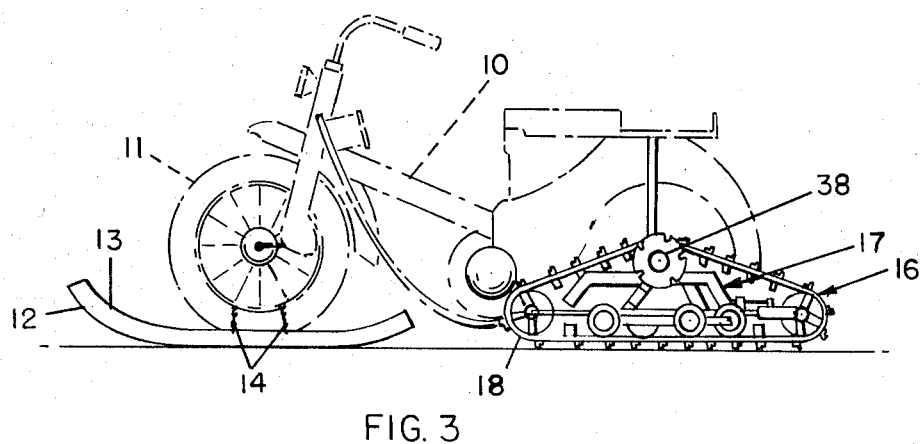
FIG. 3 is a left view of FIG. 1 taken from the side thereof. The motorcycle is shown in phantom lines.
Figure 4:
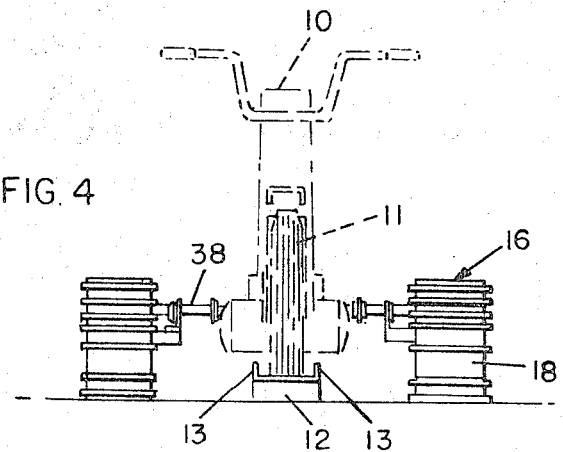
FIG. 4 is a front view of FIG. 1 with the motorcycle shown in phantom lines.

There are two endless tracks 15 and 16 and their supporting and rotating mechanisms, as one can understand by looking at the first four FIGS. of the accompanying drawings. Since both endless tracks and their mechanisms are identical except that one is right hand and one is left hand, the mechanism of only one endless track will hereinafter be described in detail in this specification. The one described is for the left-hand endless track 16. Its supporting and rotating mechanism is indicated in its entirety in the accompanying drawings by the reference number 17. However, before going into the detail construction of the just mentioned mechanism 17, the construction of the endless track 16 will now be described. The track consists of a belt 18 that is made of any desired material in the form of a single strip of flexible material that has its two ends suitably connected together in the usual manner known to those experienced in the art to form the necessary belt. A plurality of equally spaced and parallel angle irons 19 are secured laterally on the outside surface of the aforesaid belt 18 by means of an elevator bolt 20 near each end of each angle iron. A steel roller 22 having a bronze liner 23 or its equivalent, is located on each hexagonal headed bolt 21 which is so brazed or otherwise secured to the aforesaid angle iron 19 that the roller will project out beyond the edge of the belt 18, as one can clearly see on examination of FIG. 8 of the accompanying drawings. Here it is seen that there are two of the aforesaid rollers 22, one on each end of each angle iron, thereby providing a means of engagement for the endless belt with the two driving sprockets. A plurality of inverted U-shaped straps 24 are bolted to the opposite side of the aforesaid endless belt 18 as that of the previously described angle irons 19. The straps are located directly above the angle irons and the two bolts 25 that secure each strap to the belt pass through both the belt and the angle irons, as one can see by examination of FIG. 8 of the drawings. Further examination of the drawings, and particularly FIG. 3, shows that there is one strap 24 for each angle iron 19. The purpose of the aforesaid inverted U-shaped straps 24 is to provide a means of guiding the belt 18, which is the endless track, as it is rotated around its supporting framework, as will hereinafter be described.

Figure 6:
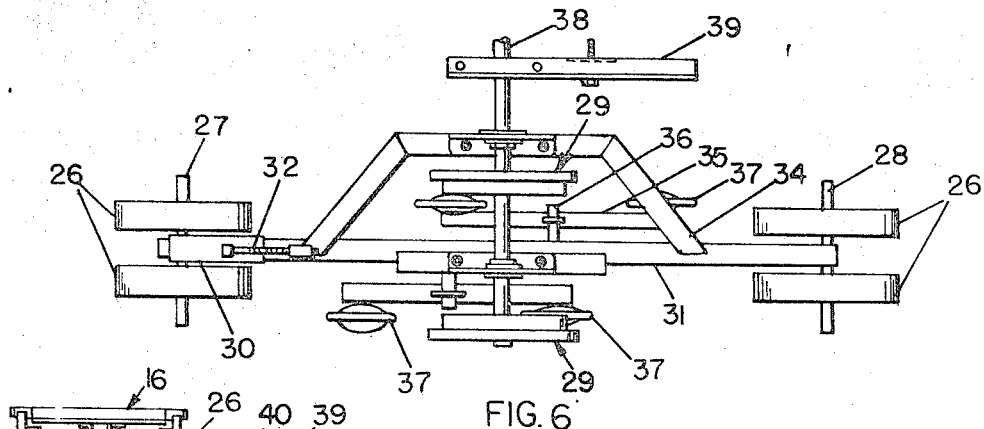
FIG. 6 is a top view of one of the track supporting and rotating mechanisms of this invention.

Directing one's attention now to FIG. 6 of the drawings it is seen that the just-described endless track 16 is supported on a plurality of wheels 26 which in this present design is limited to four: two that are mounted side by side in parallel spaced relation to one another on the front axle 27, and two of which are likewise mounted on the rear axle 28, and on two combination sprockets and wheels 29. The aforesaid front axle 27 is supported by the longitudinally adjustable tube 30 which slides on the front end of the tubular main beam 31 whose rear end provides support for the aforesaid rear axle 28. A longitudinal adjustment screw 32 has one end secured to the top of the aforesaid tube 30 and the rear end of the same screw 32 passing through a tubular lug 33 that is secured to the top of one end of the aforesaid tubular main beam 31 of this invention.

Figure 2:
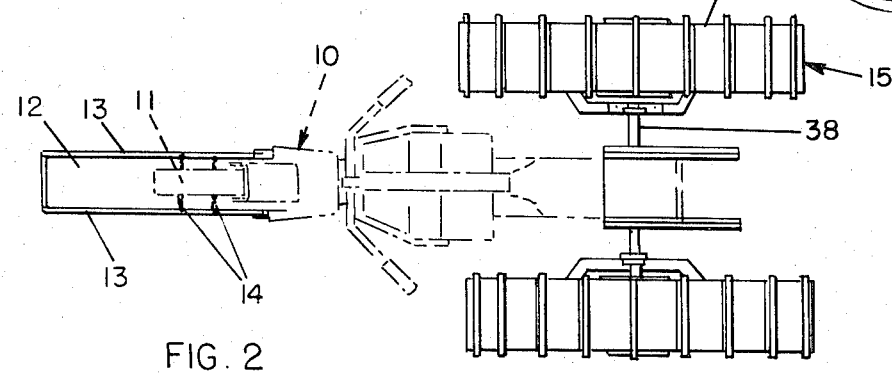
FIG. 2 is a top view of FIG. 1.
Figures 7, 8:
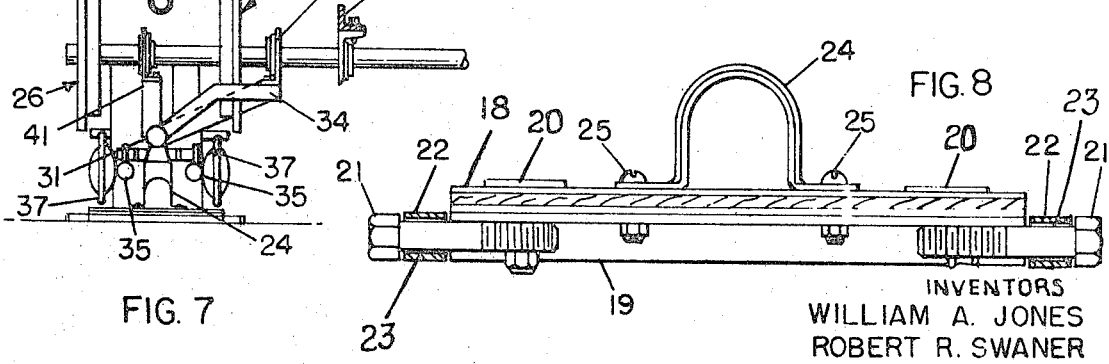
FIG. 7 is a sectional view of a portion of this invention, taken substantially along line 7—7 of FIG. 5, and viewed in the direction indicated by the arrows.
FIG. 8 is a sectional view of one of the endless tracks of this invention, taken substantially along line 8—8 of FIG. 5, and viewed in the direction indicated by the arrows.

Continuing to look at FIG. 6, as well as at FIGS. 2 and 7 of the drawings, it will be seen that the aforesaid main beam 31 supports a track supporting beam 34, basically U-shaped when viewed from the top as in FIG. 2, and two longitudinally disposed and parallel bogie beams 35. The aforesaid track supporting beam 34 has each of its two ends welded or otherwise secured to the upper surface of the aforesaid tubular main beam 31, while the aforesaid bogie beams 35 are suitably hung from the underside of the same main beam 31. Two or more longitudinally spaced bogie wheel axles 36 project outward from the upper surface of each of the aforesaid bogie beams 35 in order to provide free-turning support for the bogie wheels 37 of this invention.

Looking now at FIG. 7 of the accompanying drawings, it will be seen that the aforesaid bogie wheels 37 not only provide rolling support for the aforesaid endless tracks of this invention but also provide a means of guiding the belt 18 of the tracks around the aforesaid supporting and rotating mechanism 17 by means of the already mentioned plurality of inverted U-shaped straps 24.

Having now described in detail the aforesaid endless track and its supporting structure, attention is directed to the rear axle 38 of the motorcycle 10 and its connection to the two endless tracks of this invention. The original rear axle of the aforesaid motorcycle 10 is replaced by the new axle 38 which must obviously be longer in order to both carry and rotate the two endless tracks 15 and 16.

Although not shown in any of the views of the accompanying drawings for reasons of clarity, the aforesaid rear axle 38 is provided with the regular rear drive sprocket of the motorcycle 10 in the usual manner known to those experienced in the motorcycle construction art. The aforesaid rear axle 38 and the two endless tracks 15 and 16, which the axle supports and is rotated by, are carried by two spaced and parallel angle irons 39 that are suitably bolted to the frame of the motorcycle 10. Looking now at FIGS. 6 and 7, it will be seen that the already-described track supporting beam 34 is provided with vertically disposed structure 40 adapted to receive the aforesaid axle 38. A vertically disposed bearing mount 41 and supporting structure has its lower end secured to the longitudinal center of the aforesaid tubular main frame 31 in order to provide additional lateral stability and support for the endless track since the axle 38 also passes through this above-mentioned bearing mount 41. The previously-mentioned combination sprockets and wheels 29, of which there are two on each end of the aforesaid axle 38, are suitably mounted on the axle. Although not mentioned in every case in this specification, it is to be realized that ball or roller bearings must be provided for the reception of all rotating surfaces with the exception of the previously-described steel rollers 22 which are fitted with bronze liners 23.

Figure 5:
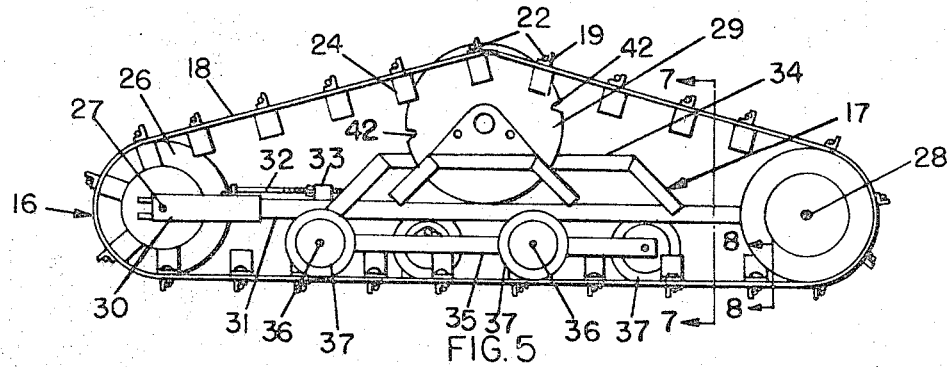
FIG. 5 is a side view of one of the endless tracks and its supporting and rotating mechanism of this invention.

Directing one's attention to FIG. 5 of the drawings, it will be seen that the sprocket of the aforesaid combination sprocket and wheel 29 (only one is mentioned here) contains a plurality of radially and equally spaced recesses 42 in the periphery thereof for the reception of the aforesaid rollers 22, thereby providing a means of rotating the endless track around its supporting and rotating mechanism 17 when the motor of the motorcycle 10 has been started and the aforesaid axle 38 has been activated into rotating motion, thereby providing movement for the motorcycle and its rider on snow, ice, or other terrain most suitable for endless track motorcycles and/or vehicles or the like. It is obvious from continued examination of FIG. 5 of the drawings that the wheel portion of each of the aforesaid combination sprocket and wheels 29 also supports the aforesaid belt 18 of the endless track(s).

From the above detailed description of the construction of this novel invention one can readily see exactly how this novel invention is assembled, therefore, no additional explanation of the same is considered necessary, particularly, when one examines the accompanying drawings when reading this specification.

It is to be understood that this novel invention of an endless track attachment for motorcycles, an invention which we personally call a snow trike, is subject to any and all changes and/or modifications in its detail design and/or configuration in so long as such changes and/or modifications fall within the scope and intent of the appended claims.

We claim:

1. An endless track attachment for motorcycles, comprising two endless tracks rotatably mounted on two supporting mechanisms, each of the said endless tracks embodies an endless belt having a plurality of angle irons suitably secured to the outer surface thereof in equal and parallel spaced relation to one another across the said belt; and a bolt having a free turning steel roller thereon secured to each end of each of the said angle irons, each roller projecting out beyond the edge of the said belt, one structure for each track and one track on each side of a motorcycle, the said mechanism supporting an axle secured to the rear end of the said motorcycle, the said axle being rotated by the motor of the said motorcycle, each roller adapted to fit into a U-shaped recess of a sprocket secured to the said axle, thereby moving the said belt when the said sprocket is rotated, the inside surface of each said belt is provided with a plurality of equally spaced and parallel inverted C-shaped straps that are located in the lateral center of the said belt thereby providing a means of keeping the said belt on its supporting mechanism.

2. The invention of claim 1, whereby the said supporting mechanism embodies both tubular and other structure adapted to adjustable support two laterally spaced front wheels and two laterally spaced rear wheels as well as a plurality of bogie wheels and two combination sprockets and wheels.

3. The invention of claim 2, whereby the said other structure is in the form of angle irons that are welded to the tubular structure.

4. The invention of claim 3, whereby the front wheel of the said motorcycle is placed on the upper surface of a skid to which it is secured by two spaced chains, each chain having its lower end secured to the upturned sides of the said skid.